Dec. 7, 1926.

W. E. ANDERSON

SPRING HANGER

Filed Dec. 10, 1924

1,609,595

Inventor
Walter E. Anderson
By Lyon & Lyon
Attorneys

Patented Dec. 7, 1926.

1,609,595

UNITED STATES PATENT OFFICE.

WALTER E. ANDERSON, OF LOS ANGELES, CALIFORNIA.

SPRING HANGER.

Application filed December 10, 1924. Serial No. 754,967.

This invention relates to spring hangers and is more particularly directed to means for freely suspending the axles of an automobile or other vehicles from the frame so that the supporting spring will be free to extend and contract when the vehicle is propelled over the uneven surface of a road.

I am aware of many attempts to similarly support an automobile frame, which attempts have for the most part been limited to the support of an automobile frame on spring members employing a yielding connection between the frame members and spring members. However, these devices have been all of the type employing two or more rigid points of suspension of the spring from the frame. Springs so held are for the most part subject to great shearing strain when the spring is depressed so as to cause the same to lengthen at its ends, whereby the normal curve in the spring is greatly flattened out or the depressing force may have been of such magnitude as to cause the spring to be bent to a point beyond the center of curvature and a great rebound force is there obtained.

It is an object of this invention to provide a spring hanger in which means are provided to greatly reduce the shearing moment occasioned in spring when the same are subjected to a quick and substantial depressing force due to the vehicle encountering a rut or depression in the surface of the runway.

It is an object of this invention to provide a spring hanger for use in securing supporting springs to a vehicle frame wherein means are provided to greatly reduce the rebound tendency common to springs as now supported.

It is an object of this invention to provide a spring hanger for use in securing supporting springs to a vehicle frame wherein means are provided to absorb the depressive shock occasioned when the vehicle encounters depressions or ruts.

Further objects and advantages will be apparent from the following detailed description of a preferred embodiment of this invention as illustrated in the accompanying drawing.

Figure 1:
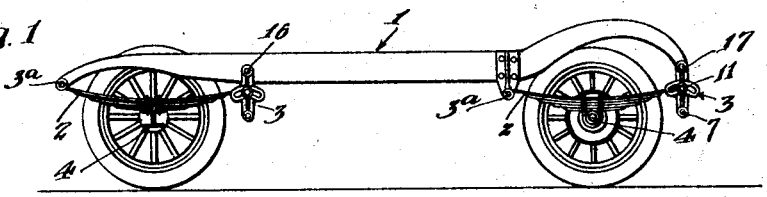
Fig. 1 is a fragmental side elevation of a vehicle frame illustrating spring hangers embodying this invention supporting the vehicle springs.
Figure 2:
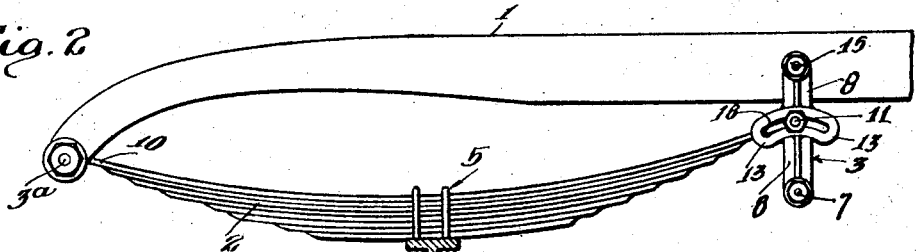
Fig. 2 is a side elevation of a spring hanger embodying this invention.
Figure 3:
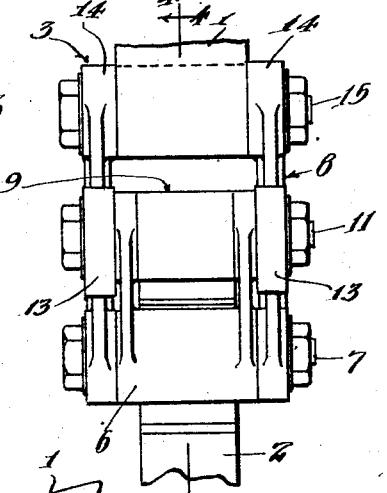
Fig. 3 is an end elevation thereof looking from right to left in Fig. 2.
Figure 4:
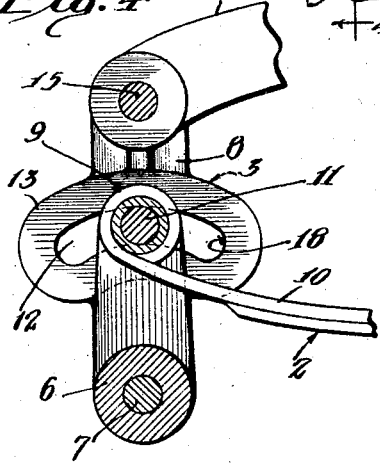
Fig. 4 is a central sectional side elevation taken substantially on the line 4—4 of Fig. 3.

In the preferred illustration shown in the drawings, 1 indicates a vehicle frame member of any suitable construction, to which springs 2 are freely supported as illustrated by the hangers 3. The forward springs 2 being supported at their rearward ends by hangers 3 and the rear springs 2 being supported at their rear end by means of hangers 3, the opposite ends of the springs 2 being rigidly held as illustrated at 3ª. The springs 2 being secured to the vehicle axles 4 by any suitable means such as illustrated at 5.

The spring hangers 3 are preferably of the following construction:

A spring shackle 6 (or any similar construction embodying a pair of straps connected together at some point) of the ordinary construction is pivotally secured by a pin or bolt 7 to a suspending bracket 8. The opposite end of the shackle 6 is pivotally secured by a pin or bolt 11 to the curved edge 9 of one of the spring plates 10 of the spring 2. The pin 11 passes through the radial guides 12 of the straps 13—13 of the suspending bracket 8. The opposite ends 14 of the brackets 8 are pivotally secured by a pin or bolt 15 to the frame 1 of the vehicle as illustrated at 16.

The ends 18 of the guides 12 act as stops when the springs 2 are suddenly depressed so that the extensions of the springs 2 will be resisted until the lower end of the hangers 3 can follow the motion of the shackle 6 when the springs are subjected to a sudden and violent depressing force.

It is preferable that the distance from the point 15 to the center of the pin 11 be less than the distance of the center of the pin 11 to the center of the pin 7, the preferred distances being: The length of the hanger from point 15 to the center of the pin 7 is seven inches and the distance from the center of the pin 7 to the center of the pin 11 is four inches. However, these distances may be varied to suit the demands of the particular frame and load carried and are herein set forth only as an illustration.

It will be observed that I have provided a spring hanger in which only one point (14) is rigidly secured and that the spring 2 will be free to extend in any manner required by the depressing force or impact force encountered when the vehicle wheels encounter ruts or depressions in the runway surface, or the load or the spring is varied.

This spring hanger also operates to prevent rebound shocks by removing completely and entirely the cause thereof, and a spring hung in the manner above specified is entirely free to be depressed to any required degree without necessitating the imposing on the spring a shearing stress as is the case of springs in which the rebound tendency is apparent and therefore a spring suspended from a vehicle frame by my spring hangers will be of greater life, and will retain its resiliency for a longer period of time.

Having fully described a preferred embodiment of this invention it is to be understood that I do not wish to be limited to the exact construction and details herein set forth and preferred which may obviously be varied without departing from the spirit of the appended claims.

I claim:

1. In a device of the class described the combination of a shackle pivotally secured to a spring and means for securing the shackle to a frame of a vehicle so as to allow freedom of longitudinal movement of the said shackle at each end thereof.

2. In a device of the class described the combination of a shackle pivotally secured to a spring at one end, means for pivotally securing the shackle to a frame of a vehicle so as to allow freedom of movement of the said shackle at each end thereof.

3. In a triple point spring hanger the combination of a longitudinally rigid pivot pin and means pivotally secured thereto and providing the other two points of suspension which latter points are free to move longitudinally.

4. In a device of the class described the combination of a shackle pivotally secured to a spring and means for securing the shackle to a frame of a vehicle so as to allow freedom of longitudinal movement of the said shackle at each end thereof, said means comprising a bracket greater than the length of the shackle and less than twice its length.

5. In a device of the class described, the combination of a bracket adapted to be pivotally secured at one end to the frame of a motor vehicle at a fixed point, a shackle pivotally secured at one end to the opposite end of the said bracket, means for securing the free end of the said shackle to a spring, and guide means on the said bracket for guiding the movement of the end of the said shackle that is secured to the said spring.

6. In a device of the class described, the combination of a pair of straps forming a bracket pivotally secured at one end to the motor vehicle frame, a pin pivotally securing a shackle to the opposite end of the said straps, a pin adapted to secure a spring to the shackle at the end of the said shackle opposite the point where the same is secured to the said straps, and means formed in the straps for guiding the latter said pin.

7. In a device of the class described, the combination of a bracket, a pin pivotally securing the said bracket to the frame of a motor vehicle at a fixed point, a shackle pivotally secured by a pin to the opposite end of the said bracket, a pin secured to the opposite end of the said shackle and adapted to pass through an eye formed in the end of the spring, and radial guide means on the said bracket for guiding the last said pin.

8. In a device of the class described, the combination of a bracket, a shackle, the said bracket being of greater length than the length of the said shackle but being less than twice the length of the said shackle, a pin adapted to pivotally support the said bracket at one end at a fixed point, a pin adapted to pivotally secure the shackle to the said bracket at the opposite free end, a pin adapted to secure the end of a spring to the opposite end of the said shackle, and radial guide means on the said bracket for guiding the last said pin.

9. In a device of the class described, the combination of a bracket adapted to be pivotally secured at its upper end by a pin to the frame of a motor vehicle, a shackle pivotally secured to the said bracket at the lower end and extending normally upward therefrom, and means for securing the said shackle at its upper end to the end of a spring.

Signed at Los Angeles, California, this 3rd day of December, 1924.

WALTER E. ANDERSON.